(12) United States Patent
Swope et al.

(10) Patent No.: US 9,868,381 B1
(45) Date of Patent: Jan. 16, 2018

(54) COMPRESSED AIR TANK FOR A TRUCK SERVICE BODY

(71) Applicant: Auto Crane Company, Inc., Tulsa, OK (US)

(72) Inventors: Christopher Swope, Broken Arrow, OK (US); Scott Pryce, Mounds, OK (US)

(73) Assignee: Auto Crane Company, Tulsa, OK (US)

( * ) Notice: Subject to any disclaimer, the term of this patent is extended or adjusted under 35 U.S.C. 154(b) by 0 days.

(21) Appl. No.: 15/236,849

(22) Filed: Aug. 15, 2016

Related U.S. Application Data

(63) Continuation of application No. 14/629,044, filed on Feb. 23, 2015, now Pat. No. 9,415,814.

(51) Int. Cl.
| | | |
|---|---|---|
| *B62D 33/00* | (2006.01) | |
| *B60P 3/14* | (2006.01) | |
| *B62D 21/16* | (2006.01) | |
| *B60R 9/06* | (2006.01) | |
| *B62D 21/02* | (2006.01) | |
| *B60R 11/06* | (2006.01) | |
| *B60R 11/00* | (2006.01) | |

(52) U.S. Cl.
CPC ................ *B60P 3/14* (2013.01); *B60R 9/065* (2013.01); *B60R 11/06* (2013.01); *B62D 21/02* (2013.01); *B62D 21/16* (2013.01); *B60R 2011/004* (2013.01)

(58) Field of Classification Search
CPC . B60P 3/14; B60R 9/065; B60R 11/06; B60R 2011/004; B62D 21/02; B62D 21/16
See application file for complete search history.

(56) References Cited

U.S. PATENT DOCUMENTS

| | | | |
|---|---|---|---|
| 3,495,767 | A | 2/1970 | Zrostlik |
| 1,400,131 | A | 8/1983 | Blake |
| 1,423,980 | A | 1/1984 | Warnock |
| 5,111,762 | A | 5/1992 | Frangiamore |
| 5,115,750 | A | 5/1992 | White et al. |
| 5,131,788 | A | 7/1992 | Hulicsko |
| 5,333,969 | A | 8/1994 | Blaha et al. |
| 5,873,498 | A | 2/1999 | Moore et al. |
| 6,065,942 | A | 5/2000 | Glidden et al. |
| 6,660,967 | B2 | 12/2003 | Brofft et al. |
| 6,670,580 | B2 | 12/2003 | Brofft et al. |
| 7,870,915 | B2 | 1/2011 | Beeson et al. |

FOREIGN PATENT DOCUMENTS

| | | |
|---|---|---|
| JP | 06227308 | 8/1994 |
| JP | 2006327461 | 12/2006 |
| WO | 2005108162 | 11/2005 |

*Primary Examiner* — Lori L Lyjak
(74) *Attorney, Agent, or Firm* — Gable Gotwals

(57) ABSTRACT

A service body mountable on a truck chassis where compressed air tanks are mounted to the service body frame. The compressed air tanks being contained within a mounting envelope defined as the volume between the frame rails of the service body. The mounting envelope further defined as the volume between a first plane formed by the top surface of the service body frame rails and a second plane formed by the bottom surface of the service body frame rails.

20 Claims, 3 Drawing Sheets

Fig. 3

COMPRESSED AIR TANK FOR A TRUCK SERVICE BODY

1. FIELD OF THE INVENTION

The present invention relates generally to a service body for mounting on a truck chassis. More particularly, the present invention relates to the mounting of compressed air tanks on a truck service body.

2. BACKGROUND OF THE INVENTION

Truck service bodies provide storage cabinets and other storage, for utility and service trucks. They also provide the ability to mount cranes, welders, compressors and other specialized tools on a truck. They can be mounted on Class 3-8 truck chassis in lieu of a traditional pickup bed. Truck service bodies are commonly used by utility companies to carryout work in the field. The most common arrangement of a service body is to have a plurality of cabinets along the driver and passenger side of the truck. These cabinets are accessible from their respective sides of the vehicle. There is also a bed which is locate between the rows of cabinets One of the more common accessories found on a truck service body is an air compressor. The compressed air is used to operate various pneumatic tools and lifts. It is beneficial to have one or more air storage tanks mounted on the truck. Traditionally these storage tanks have been mounted to the truck chassis frame. They typically were located in a volume defined by the truck chassis frame or the truck chassis frame and the service body frame. FIG. 1 shows the location of the prior art under the cab of a Class 3, 4 or 5 truck chassis. Here the tank is attached to and is contained in part in a volume defined by the truck chassis frame. It also extends below the truck chassis frame. FIG. 2 shows the prior art location of a compressed air tank on a Class 6, 7 or 8 truck chassis. Here the air tank is mounted at the rear of the truck to the truck chassis frame. It is contained in part in a volume defined by the truck chassis frame and extends up into a volume defined by the service body frame.

Each truck chassis manufacturer has its own unique truck chassis frame. The layout of the truck chassis frame impacts the location and size of the compressed air tanks. This means a different tank and service body frame must be used with each brand of truck. This adds to the amount of inventory a service body manufacturer must keep.

What is needed, therefore, is a tank system that allows for the use of a service body on any truck chassis without consideration of truck chassis manufacturer or relocation of the compressed air tanks.

BRIEF SUMMARY OF THE INVENTION

The present invention achieves its objections by providing a truck service body with one or more compressed air storage tanks located within the frame of the service body. Further the compressed air storage tanks do not extend into the truck chassis frame. Thus the same truck service body can be used regardless of the truck chassis manufacture without relocating the compressed air storage tanks.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
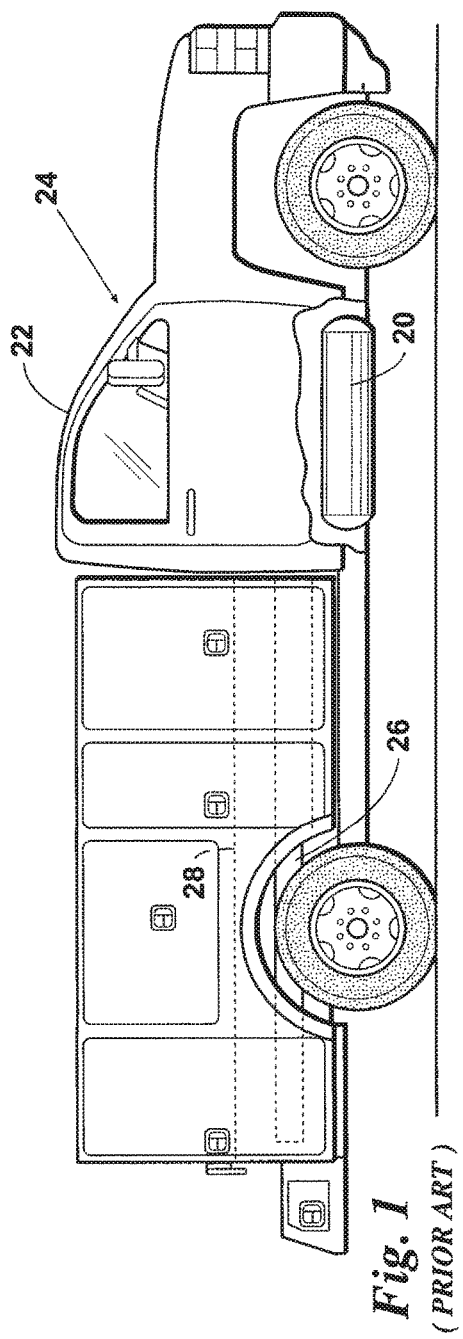
FIG. 1 is a side view of a truck with a service body which illustrates the prior art location of a compressed air tank on a Class 3-5 truck chassis.

Turning now to the drawings wherein like reference characters indicate like or similar parts throughout. FIG. 1 shows the prior art location of a compressed air tank 20 under the cab 22 of a truck 24, in this case a Class 3, 4 or 5 truck chassis. Here the tank 20 is attached to and is contained in part in a volume defined by the truck chassis frame 26. It also extends below the truck chassis frame 26.

Figure 2:
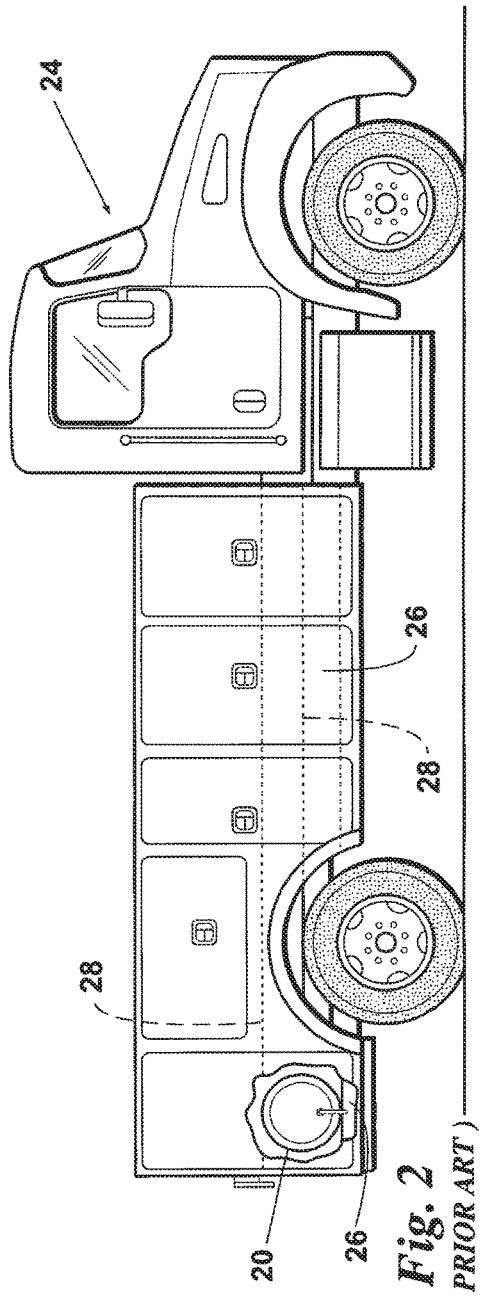
FIG. 2 is a is a side view of a truck with a service body which illustrates another prior art location of a compressed air tank on a Class 6-8 truck chassis.

FIG. 2 shows the prior art location of a compressed air tank 20 on a truck chassis 20, in this case a Class 6, 7 or 8 truck chassis. Here the air tank 20 is mounted at the rear of the truck 24 to the truck chassis frame 26. It is contained in part in a volume defined by the truck chassis frame 26 and extends up into a volume defined by the service body frame 28.

Figure 3:
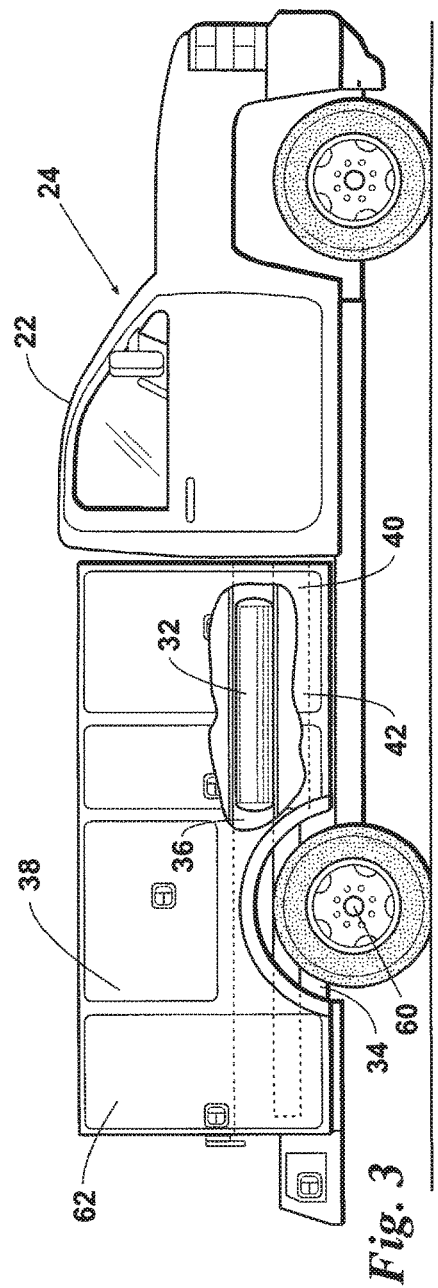
FIG. 3 is a side view showing the preferred embodiment of the present invention on a Class 3-5 truck chassis.
Figure 4:
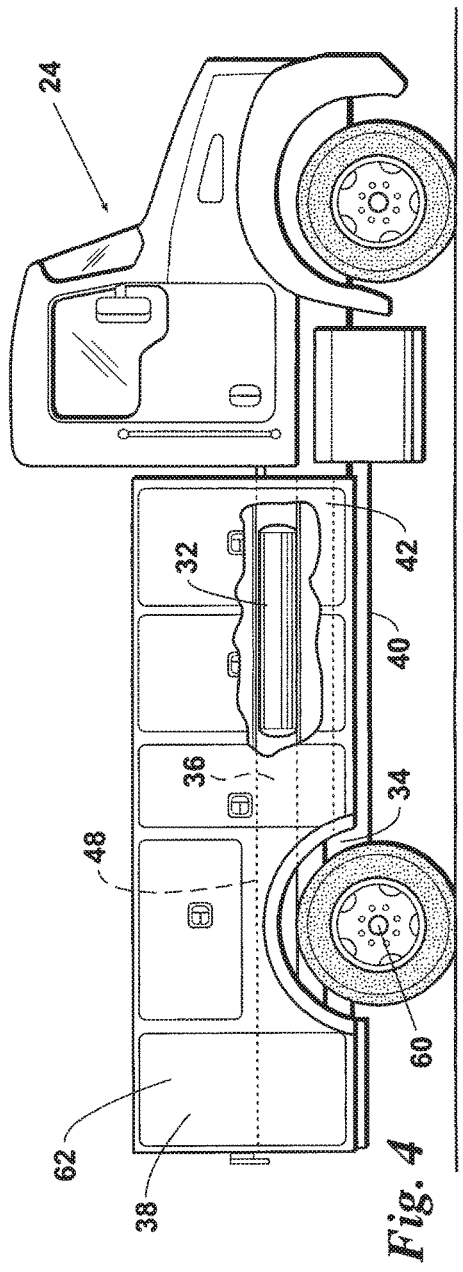
FIG. 4 is a side view showing the preferred embodiment of the present invention on a Class 6-8 truck chassis.
Figure 5:
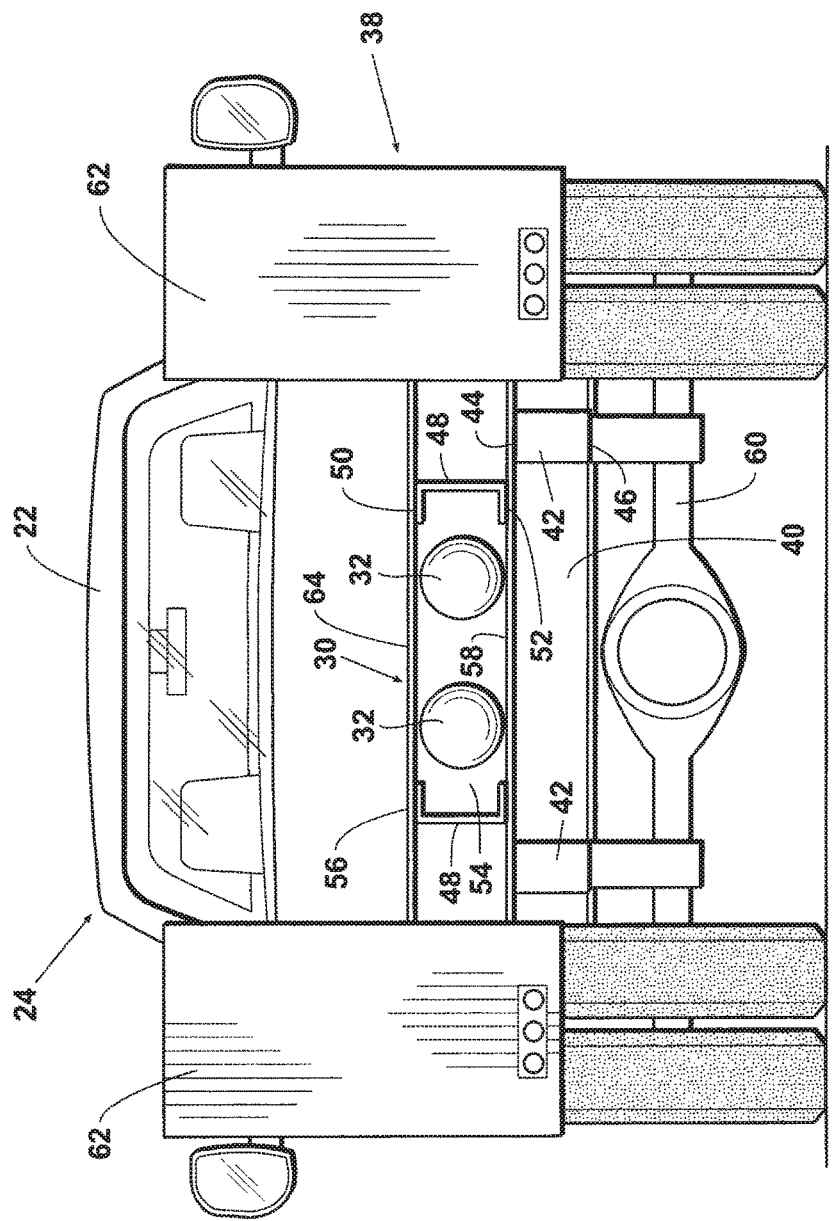
FIG. 5 is a partial sectional end view of the preferred embodiment of the present invention.

Turning now to FIG. 3 which shows the location 30 of the compressed air tank 32 of the present invention on a truck chassis 34, in this case a Class 3, 4 or 5 truck chassis. The compressed air tank 32 is secured to the frame 36 of the service body 38. FIG. 4 shows the same invention except mounted on a Class 6, 7 or 8 truck chassis 34. FIG. 5 shows a partial sectional view of the service body 38 mounted on a truck chassis 34. The truck chassis 34 has a frame 40 with two rails 42 which are parallel and extend longitudinally through the truck chassis 34. Each rail 42 has a top surface 44 and a bottom surface 46.

The service body 38 has a frame 36 with two or more parallel rails 48 which extend longitudinally through the service body 38. The frame 36 of the service body 38 may also have two or more cross members extending between the rails 48. Each service body frame rail 48 has a top surface 50 and a bottom surface 52.

In the preferred embodiment of the present invention one or more compressed air tank 32 are contained entirely within a mounting envelope 54 defined by the volume between two service body frame rails 48. The mounting envelope 54 may be further defined as the volume between an upper plane 56 defined by the top surfaces 50 of the service body frame rails 48 and a lower plane 58 defined by the bottom surfaces 52 of the service body frame rails 48. The mounting envelope 54 may be located anywhere along the service body frame rails 48. However the preferred embodiment as shown in FIGS. 3 and 4 is forward of the truck chassis' 34 rear axle 60.

As best seen in FIG. 5, the tank mounting envelope 54 is located above the truck chassis frame 40. More specifically above a plane defined by the top surface 44 of the truck chassis frame rails 42.

Further the compressed air tank or tanks 32 are mounted to or otherwise secured to the service body 38, in the preferred embodiment the tanks 32 are mounted to the service body frame 36 or service body frame rails 48. As can be seen in FIGS. 3, 4 and 5 the service body 38 may be equipped with various storage cabinets 62. The service body 38 may also be equipped with a bed 64 located above the mounting envelope 54. Various equipment including but not limited to a compressor, welder, generator or crane may be mounted in the bed 64, in or on the storage cabinets 62 or elsewhere on the service body 38.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A service body mountable on a truck chassis frame, said service body comprising:
   a service body frame located above a plane defined by a top surface of the truck chassis frame, the service body frame having two or more frame rails, each service body frame rail having a top surface and a bottom surface; and
   a tank mounting envelope located between the service body frame rails and a plane defined by the top surface of the service body frame rails and a plane defined by the bottom surface of the service body frame rails.

2. The service body of claim 1, further comprising:
   a truck bed located above the tank mounting envelope.

3. The service body of claim 1, further comprising:
   the tank mounting envelope located forward of a rear axle of the truck chassis.

4. The service body of claim 1, further comprising:
   a plurality of storage cabinets.

5. A service body mountable on a truck chassis, said service body comprising:
   a service body frame with two or more service body frame rails, each service body frame rail having a top surface and a bottom surface;
   a compressed air tank mounting envelope located between the two or more of the service body frame rails and between a plane defined by the top of the service body frame rail and the bottom of the service body frame rail;
   a truck bed located above the compressed air tank mounting envelope.

6. The service body of claim 5 further comprising:
   at least one compressed air tank contained within the compressed air tank mounting envelope.

7. The service body of claim 6 further comprising:
   the at least one compressed air tank being mounted to the service body frame.

8. The service body of claim 1 further comprising:
   one or more tanks contained within the tank mounting envelope.

9. The service body of claim 8, further comprising the one or more tanks including a compressed air tank.

10. The service body of claim 8, further comprising:
    the one or more tanks being located above the truck chassis frame.

11. The service body of claim 8, further comprising:
    the one or more tanks being mounted to the service body.

12. The service body of claim 8, further comprising:
    the one or more tanks being mounted to the service body frame.

13. The service body of claim 8, further comprising:
    the one or more tanks being mounted to the service body frame rails.

14. A service body mountable on a truck chassis, the service body comprising:
    service body frame rails configured for connection to the truck chassis; and
    a tank mounting envelope located between the service body frame rails and within a top and a bottom plane defined, respectively, by a top and a bottom of the service body frame rails.

15. The service body of claim 14, further comprising:
    at least one compressed air tank located within the tank mounting envelope.

16. The service body of claim 15, further comprising:
    the at least one compressed air tank being located above the truck chassis frame.

17. The service body of claim 16, further comprising:
    the one or more tanks being mounted to the service body.

18. The service body of claim 14, further comprising:
    a truck bed located above the tank mounting envelope.

19. The service body of claim 14, further comprising:
    the tank mounting envelope located forward of a rear axle of the truck chassis.

20. The service body frame of claim 14 further comprising:
    the service body frame rails located above a plane defined by a top surface of a frame of the truck chassis.

* * * * *